(12) United States Patent
Song et al.

(10) Patent No.: US 9,894,546 B2
(45) Date of Patent: Feb. 13, 2018

(54) METHOD, APPARATUS, AND SYSTEM FOR DETERMINING A LINK COVERAGE PROBLEM

(71) Applicant: Huawei Technologies Co., Ltd., Shenzhen, Guangdong (CN)

(72) Inventors: Zhigang Song, Shanghai (CN); Dong Zhao, Shanghai (CN); Yang He, Shanghai (CN)

(73) Assignee: Huawi Technologies Co., Ltd., Shenzhen (CN)

(*) Notice: Subject to any disclaimer, the term of this patent is extended or adjusted under 35 U.S.C. 154(b) by 35 days.

(21) Appl. No.: 14/532,721

(22) Filed: Nov. 4, 2014

(65) Prior Publication Data
US 2015/0056981 A1 Feb. 26, 2015

Related U.S. Application Data

(63) Continuation of application No. PCT/CN2013/073669, filed on Apr. 2, 2013.

(30) Foreign Application Priority Data

May 4, 2012 (CN) .......................... 2012 1 0136979

(51) Int. Cl.
*H04W 24/00* (2009.01)
*H04W 24/08* (2009.01)
(Continued)

(52) U.S. Cl.
CPC ........... *H04W 24/08* (2013.01); *H04W 16/24* (2013.01); *H04W 24/04* (2013.01)

(58) Field of Classification Search
CPC ..... H04W 16/24; H04W 24/04; H04W 24/08; H04W 24/10; H04W 24/02; H04W 28/04;
(Continued)

(56) References Cited

U.S. PATENT DOCUMENTS 6,684,061 B1 * 1/2004 Yost ..................... H04B 17/345
455/423
8,780,732 B2 * 7/2014 Song ..................... H04W 24/02
370/216

(Continued)

FOREIGN PATENT DOCUMENTS

| CN | 1719926 A | 1/2006 |
|---|---|---|
| CN | 102045808 A | 5/2011 |

OTHER PUBLICATIONS

"3rd Generation Partnership Project; Technical Specification Group Services and System Aspects; Telecommunication management; Subscriber and equipment trace; Trace control and configuration management (Release 11)", 3GPP TS 32.422 V11.3.0, Mar. 2012, 121 pages.

(Continued)

*Primary Examiner* — Kathy Wang-Hurst
*Assistant Examiner* — B. M. M Hannan

(57) ABSTRACT

A method, apparatus, and system for determining link coverage problem are disclosed. Downlink measurement data and uplink measurement data are correlated to perform analysis, so that determining of a link coverage problem no longer depends only on the downlink measurement data, but depends on a combination of the downlink measurement data and the uplink measurement data. In this way, the determining of the link coverage problem is more accurate, which facilitates subsequent use of a correct solution.

11 Claims, 6 Drawing Sheets

(51) Int. Cl.
*H04W 24/04* (2009.01)
*H04W 16/24* (2009.01)

(58) Field of Classification Search
CPC . H04W 36/0083; H04W 48/12; H04W 52/14; H04W 72/042; H04W 72/1273; H04W 76/027; H04W 76/028; H04W 76/046; H04W 76/048; H04W 8/30; H04B 17/318; H04B 17/345
USPC ....... 455/423, 67.11, 115.1, 226.1, 436, 439, 455/442; 370/252
See application file for complete search history.

(56) References Cited

U.S. PATENT DOCUMENTS

| | | | | |
|---|---|---|---|---|
| 2008/0280638 | A1* | 11/2008 | Malladi | H04W 52/08 455/522 |
| 2010/0105425 | A1* | 4/2010 | Asokan | H04B 1/406 455/552.1 |
| 2010/0113008 | A1* | 5/2010 | Wang | H04L 1/20 455/423 |
| 2010/0150017 | A1* | 6/2010 | Choo | H04W 52/283 370/252 |
| 2010/0267378 | A1* | 10/2010 | Hamabe | H04W 24/10 455/423 |
| 2010/0330921 | A1* | 12/2010 | Kim | H04W 24/10 455/67.11 |
| 2011/0183661 | A1* | 7/2011 | Yi | H04W 24/10 455/422.1 |
| 2011/0250880 | A1 | 10/2011 | Olsson | |
| 2012/0039189 | A1* | 2/2012 | Suzuki | H04W 24/10 370/252 |
| 2012/0064886 | A1* | 3/2012 | Kim | H04W 24/04 455/423 |
| 2012/0106386 | A1* | 5/2012 | Johansson | H04W 24/10 370/252 |
| 2012/0156999 | A1* | 6/2012 | Kato | H04J 3/0682 455/63.1 |
| 2012/0163192 | A1* | 6/2012 | Bae | H04W 76/027 370/242 |
| 2013/0189973 | A1* | 7/2013 | Chang | H04W 24/04 455/423 |
| 2014/0317461 | A1* | 10/2014 | Li | H04W 24/04 714/712 |
| 2014/0378138 | A1* | 12/2014 | Chang | H04W 36/0083 455/436 |
| 2015/0044972 | A1* | 2/2015 | Lee | H04W 24/10 455/67.11 |

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", 3GPP TS 37.320 V10.4.0, Dec. 2011, 18 pages.

"Introduction of MDT enhancements", MediaTek, Change Request, 3GPP TSG-RAN WG2 Meeting #77bis, Mar. 25-30, 2012, 17 pages.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", 3GPP TS 37.320 V10.2.0, Jun. 2011, 17 pages.

Li Deyi, et al., "Research on the Imbalance of WCDMA Uplink and Downlink", Jan. 31, 2012, 5 pages.

* cited by examiner

# METHOD, APPARATUS, AND SYSTEM FOR DETERMINING A LINK COVERAGE PROBLEM

CROSS-REFERENCE TO RELATED APPLICATIONS

This application is a continuation of International Application No. PCT/CN2013/073669, filed on Apr. 2, 2013, which claims priority to Chinese Patent Application No. 201210136979.6, filed on May 4, 2012, both of which are hereby incorporated by reference in their entireties.

TECHNICAL FIELD

The present invention relates to the field of communications technologies, and in particular, to a method, apparatus, and system for determining a link coverage problem.

BACKGROUND

In an existing communications network, because of a problem in planning or optimization, link coverage problems often occur, for example, a downlink coverage problem, an uplink coverage problem, and a problem of unbalanced uplink and downlink coverage. These link coverage problems may cause occurrence of a radio link key event, such as a radio link failure (radio link failure, RLF). When detecting occurrence of a radio link key event, a user equipment (user equipment, UE) may record related data, and after reestablishment succeeds or a radio resource control (radio resource control, RRC) connection is established, report the recorded data of the radio link key event to a base station. However, the data of the radio link key event can generally reflect only a downlink situation, and therefore problems such as an uplink coverage problem and a problem of unbalanced uplink and downlink coverage cannot be analyzed or located according to the data of the radio link key event.

SUMMARY

Embodiments of the present invention provide a method, apparatus, and system for determining a link coverage problem, so as to determine a link coverage problem when a radio link key event occurs.

According to one aspect, a method for determining a radio link coverage problem is provided, the method includes: correlating downlink measurement data and uplink measurement data; and determining a radio link coverage problem according to the correlated downlink measurement data and uplink measurement data.

According to another aspect, a communications apparatus is provided, the apparatus includes: a correlating unit, configured to correlate downlink measurement data and uplink measurement data; and an analyzing unit, configured to determine a radio link coverage problem according to the correlated downlink measurement data and uplink measurement data.

According to another aspect, a communications system is provided, the system includes the communications apparatus described above.

In the prior art, when a radio link key event occurs, a user equipment may be triggered to report data of the radio link key event, the data of the radio link key event includes only downlink measurement data reflecting a downlink situation, and therefore whether occurrence of the radio link key event is related to an uplink coverage problem cannot be accurately determined according to the downlink measurement data. According to the foregoing method, apparatus, and system, the downlink measurement data and the uplink measurement data are correlated for analysis, so that determination of the link coverage problem no longer depends only on the downlink measurement data, but depends on a combination of the downlink measurement data and the uplink measurement data. In this way, the determination of the link coverage problem is more accurate, and the accurate determination of the link coverage problem facilitates subsequent use of a correct solution.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
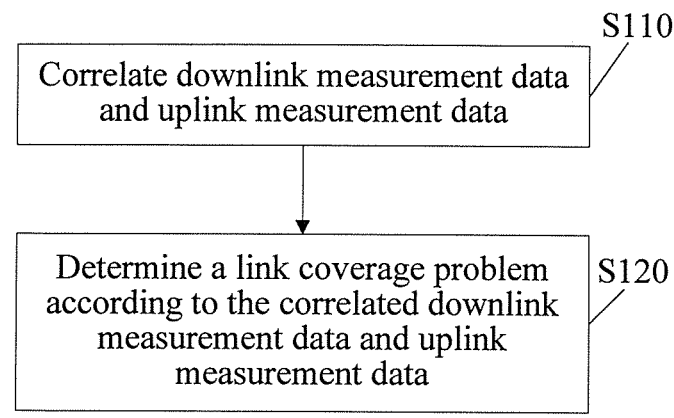
FIG. 1 is a schematic flowchart of a method for determining a link coverage problem according to an embodiment of the present invention.

Refer to FIG. 1, which is a schematic flowchart of a method for determining a link coverage problem according to an embodiment of the present invention. As shown in FIG. 1, the method includes:

S110: Correlate downlink measurement data and uplink measurement data.

S120: Determine a link coverage problem according to the correlated downlink measurement data and uplink measurement data.

The downlink measurement data is used to reflect a downlink situation, and can be obtained by means of triggering by a radio link key event, for example, the downlink measurement data is obtained by RLF measurement. Occurrence of the RLF may trigger a UE to send an RLF report, and the RLF report includes the downlink measurement data reflecting the downlink situation, for example, including data reflecting the downlink situation, such as reference signal received power (reference signal received power, RSRP), or reference signal received quality (reference signal received quality, RSRQ). Certainly, the RLF is only used as an example, and the radio link key event is not limited in this embodiment. For example, the radio link key event may further be a UE failure, which thereby triggers the UE to send a UE failure report carrying the downlink measurement data. For another example, minimization of drive test (minimization of drive test, MDT) data, which is periodically measured or reported, includes data M1 (M1: the RSRP or the RSRQ) reflecting the downlink situation, and for the M1, the M1 is reported when the RLF occurs, and is one type of downlink measurement data.

The uplink measurement data is used to reflect an uplink situation, and may be obtained by means of periodic measurement or reporting. For example, MDT data, PM data, alarm data sent out for a network fault, monitoring data for network signaling, or RRM data is obtained by using MDT, performance management (performance management, PM), an alarm (alarm, AM), a trace (Trace), or radio resource management (radio resource management, RRM) measurement. The data includes the uplink measurement data reflecting the uplink situation, for example, uplink signal strength, uplink signal power, uplink signal quality, or a signal to interference plus noise ratio of an uplink signal.

It should be noted that, the MDT data not only includes the downlink measurement data M1 reflecting the downlink situation, but also includes uplink measurement data M2 and M3 (for example, M2: power headroom (power headroom), and M3: uplink signal strength or signal to interference plus noise ratio (uplink signal strength/signal to interference plus noise ratio (SINR)) reflecting the uplink situation, where the M2 may be measured by the UE, and periodically reported to a network side, and the M3 may be periodically measured and obtained on the network side. For the M1, the M1 is reported when the RLF occurs; and for the M2 and M3, the M2 and M3 are not reported when the RLF occurs. It can be seen that, the downlink measurement data M1 in the MDT data may be obtained by means of triggering by the RLF; the uplink measurement data M2 and M3 in the MDT data cannot be obtained by means of triggering by the RLF, but is obtained by means of periodic measurement or reporting. Therefore, when the RLF occurs, the link coverage problem cannot be accurately determined by combining the downlink measurement data M1 and the uplink measurement data M2 and M3 in the MDT data.

It can be seen that, in the prior art, when a radio link key event occurs, a UE may be triggered to report data of the radio link key event, the data of the radio link key event includes only downlink measurement data reflecting a downlink situation, and therefore whether occurrence of the radio link key event is related to an uplink coverage problem cannot be accurately determined according to the downlink measurement data. According to the method provided in the embodiment shown in FIG. 1, the downlink measurement data and the uplink measurement data are correlated for analysis, so that determination of the link coverage problem no longer depends only on the downlink measurement data, but depends on a combination of the downlink measurement data and the uplink measurement data. In this way, the determination of the link coverage problem is more accurate, and the accurate determination of the link coverage problem facilitates subsequent use of a correct solution. For example, if the link coverage problem is the uplink coverage problem, after optimization and analysis, uplink coverage may be optimized and compensated by adjusting an antenna parameter (an azimuth angle, a downtilt angle, and the like) and a parameter of the UE, such as initial transmit power; if the link coverage problem is a downlink coverage problem, after optimization and analysis, downlink coverage may be optimized and compensated by adjusting an antenna parameter (an azimuth angle, a downtilt angle, and the like) and a parameter of a base station, such as transmit power, which thereby solves the problem of unbalanced uplink and downlink coverage.

The correlating described in step S110 refers to correlating two groups of data by using a factor, so that the two groups of data are comprehensively considered for analyzing and determining the link coverage problem. The factor may be time, or may also be an identifier, for example, a UE identifier or a cell identifier. Preferably, the downlink measurement data and the uplink measurement data may be correlated by combining time and an identifier.

Therefore, in the foregoing step S110, the downlink measurement data and the uplink measurement data may be correlated by using a time window, the downlink measurement data and the uplink measurement data may be correlated by using a UE identifier or a cell identifier, or the two correlation manners may also be combined.

To make features and advantages of the foregoing method more apparent and understandable, descriptions are made in the following separately by using a correlation by using a UE identifier or a cell identifier, a correlation by using the time window, and a correlation by using a combination of the two manners as examples.

Figure 2:
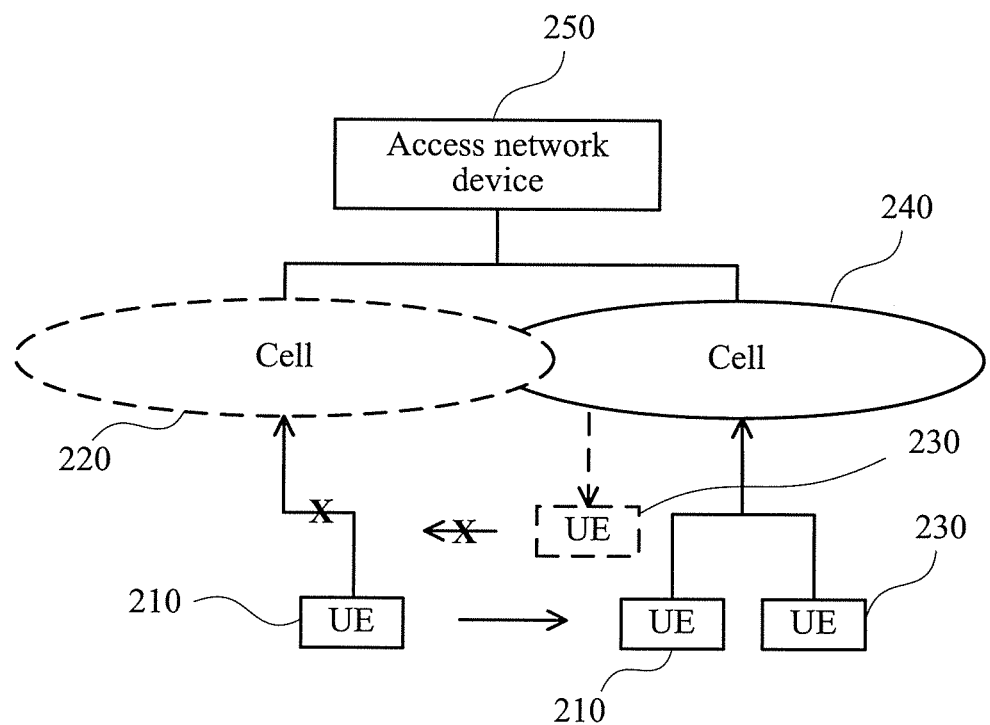
FIG. 2 is a schematic diagram of an application scenario of a method for determining a link coverage problem according to an embodiment of the present invention.

Refer to FIG. 2, which is a schematic diagram of an application scenario of a method for determining link coverage problem according to an embodiment of the present invention. In this embodiment, downlink measurement data and uplink measurement data are correlated according to a UE identifier or a cell identifier.

As shown in FIG. 2, because a link coverage problem exists in a cell (cell) 220, a UE 210 accessing the cell 220 may encounter an RLF. When the RLF occurs, the UE 210 may record RLF measurement data to form an RLF report. Then, the UE 210 continuously retries a connection, and accesses a cell 240. After successfully accessing the cell 240, the UE 210 may report the previously recorded RLF report to an access network device 250 on a network side. In this case, a radio link key event is the RLF, and the RLF report reported by the UE 210 includes downlink measurement data. In the prior art, it is inaccurate to determine the link coverage problem of the cell 220 by using only downlink measurement data without correlating the downlink measurement data and uplink measurement data, especially when an uplink coverage problem exists in the cell 220. In this embodiment, the access network device 250 obtains uplink measurement data on the UE 210 or the cell 220 according to an identifier of the UE 210 or an identifier of the cell 220, so as to comprehensively consider the downlink measurement data reported by the UE 210 and the obtained uplink measurement data, and determine whether the RLF of the UE 210 is caused by an uplink coverage problem or caused by a downlink coverage problem. The identifier of the UE 210 or the identifier of the cell 220 may be reported to the access network device 250 by using the RLF report reported by the UE 210. In addition, when the link coverage problem is analyzed, if the downlink measurement data is abnormal, and the uplink measurement data is normal, it is determined that a coverage problem exists in a downlink or uplink coverage is greater than downlink coverage; if the downlink measurement data is normal, and the uplink measurement data is abnormal, it is determined that a coverage problem exists in an uplink or the uplink coverage is less than the downlink coverage.

Referring to FIG. 2 continuously, when a UE 230 is handed over from the cell 240 to the cell 220, the UE 230 may encounter an RLF because the link coverage problem exists in the cell 220. In this case, the UE 230 records RLF measurement data to form an RLF report. In addition, the UE 230 continuously retries a connection; after re-accessing the cell 240, the UE 230 may report the previously recorded RLF report to the access network device 250, where the RLF report includes downlink measurement data. In the prior art, it is inaccurate to determine the link coverage problem of the cell 220 by using only downlink measurement data without correlating the downlink measurement data and uplink measurement data, especially when an uplink coverage problem exists in the cell 220. In this embodiment, the access network device 250 obtains uplink measurement data on the UE 230 or the cell 220 according to an identifier of the UE 230 or an identifier of the cell 220, so as to comprehensively consider the downlink measurement data reported by the UE 230 and the obtained uplink measurement data, and determine whether the RLF of the UE 230 is caused by an uplink coverage problem or caused by a downlink coverage problem. The identifier of the UE 230 or the identifier of the cell 220 may be reported to the access network device 250 by using the RLF report reported by the UE 230. In addition, when the link coverage problem is determined, if the downlink measurement data is abnormal, and the uplink measurement data is normal, it is determined that a coverage problem exists in a downlink or uplink coverage is greater than downlink coverage; if the downlink measurement data is normal, and the uplink measurement data is abnormal, it is determined that a coverage problem exists in an uplink or the uplink coverage is less than the downlink coverage.

When a radio link key event occurs, an involved UE identifier or cell identifier may be included in a report of the radio link key event. In addition, when a UE accesses a network, a network side may save a correspondence between a network measurement task identifier and the UE identifier or the cell identifier; and uplink measurement data (such as, MDT data, RRM data or PM data), which is periodically measured or reported, may include the network measurement task identifier. Therefore, downlink measurement data in the report of the radio link key event and the uplink measurement data, which is periodically measured or reported, may be subsequently correlated according to the correspondence between the network measurement task identifier and the UE identifier or the cell identifier.

The UE identifier may be a cell radio network temporary identifier (cell radio network temporary identify, CRNTI), a short media access control (short media access control, Short-MAC) identifier, an international mobile subscriber identity (international mobile subscriber identity, IMSI), or an international mobile equipment identity (international mobile equipment identity, IMEI). The network measurement task identifier may be a trace reference number (trace reference, TR) or a trace recording session reference number (trace recording session reference, TRSR), which is not limited in this embodiment.

In addition, the UE identifier is generally allocated by an access network device to the UE, and after allocation, the UE generally retains the UE identifier only for a period of time, for example, 48 hours. Therefore, after allocating a user equipment identifier resource, the access network device releases the user equipment identifier resource after retaining the allocated user equipment identifier resource for a same period of time (for example, 48 hours); when the access network device finds, when receiving the downlink measurement data, that the retained user equipment identifier resource is consistent with the UE identifier involved in the downlink measurement data, the access network device releases the consistent UE identifier resource. In this way, it may be avoided that when the access network device obtains the downlink measurement data, a matching error occurs because the access network device repeatedly allocates the UE identifier corresponding to the downlink measurement data.

Figure 3:
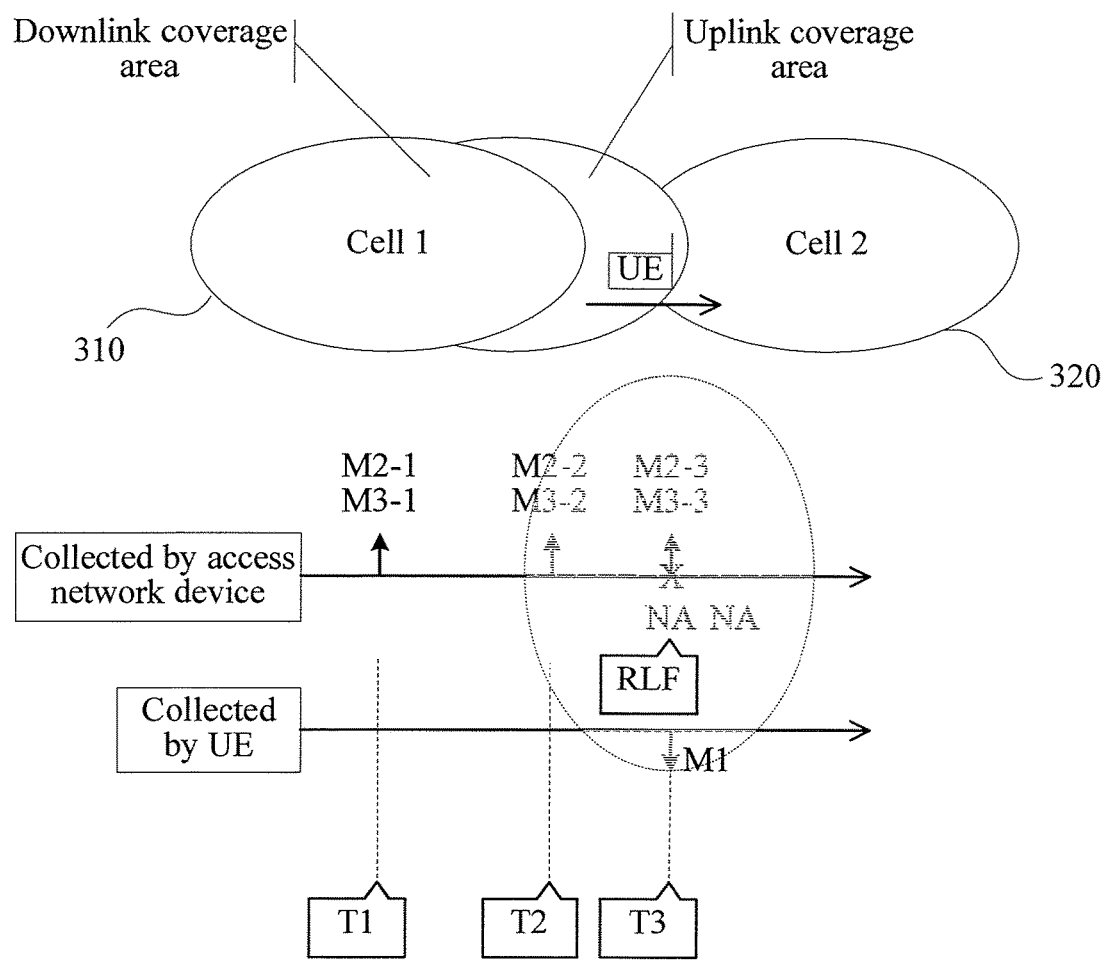
FIG. 3 is a schematic diagram of another application scenario of a method for determining a link coverage problem according to an embodiment of the present invention.

Refer to FIG. 3, which is a schematic diagram of another application scenario of a method for determining a link coverage problem according to an embodiment of the present invention. Descriptions are made by using an example in which downlink measurement data and uplink measurement data are correlated by using a time window.

As shown in FIG. 3, uplink coverage is greater than downlink coverage in a cell 310 (one type of unbalanced uplink and downlink coverage), and a cell 320 is a normal cell. An access network device of the cell 310 periodically event-triggers or periodically collects network measurement data (for example, establishes an MDT task or a PM measurement task) because of periodic event triggering. In this embodiment, establishing an MDT task is used as an example, the uplink measurement data is M2 and M3 in MDT measurement data, and the downlink measurement data is M1 in the MDT measurement data. Both T1 and T2 in FIG. 3 are collection moments of the uplink measurement data M2 and M3. When a UE moves from the cell 310 to the cell 320, the UE may encounter an RLF because the uplink and downlink coverage in the cell 310 is unbalanced, and T3 in FIG. 3 is an occurrence moment of the RLF. In this case, the UE may record the downlink measurement data M1 at the T3 moment, and it can be known from the foregoing descriptions of the MDT data, that the RLF is a condition for reporting the M1; therefore, in this case, the UE may report the downlink measurement data M1 to the access network device. It should be noted that, the UE may report the downlink measurement data in the cell 310, or may also report the downlink measurement data in the cell 320. This is because after the UE encounters the RLF, the UE may re-access the cell 310 or may also move to access the cell 320.

In addition, at the occurrence moment or within a period of time after occurrence of the RLF, because the uplink coverage is large, the access network device of the cell 310 still can measure the corresponding uplink measurement data M2 and M3, for example, M2-3 and M3-3 in the figure.

In the prior art, for the moment of or a moment close to the occurrence of the RLF, the uplink measurement data M2 and M3 and the downlink measurement data M1 of the UE are not correlated at the moment, and especially, it is already specified in the prior art that the RLF is an unusable condition for reporting the uplink measurement data M2 and M3. Therefore, the uplink measurement data M2 and M3 and the downlink measurement data M1 are not considered comprehensively to determine whether the RLF is caused by an uplink coverage problem or a downlink coverage problem.

In this embodiment, the downlink measurement data M1 and the uplink measurement data M2 and M3 are correlated by using the occurrence time of the RLF, and the data closest to each other in terms of time is correlated with each other. For example, the downlink measurement data M1 and uplink measurement data M2-3 and M3-3 in a dashed line frame in FIG. 3 are correlated with each other. If the uplink measurement data M2-3 and M3-3 cannot be obtained, uplink measurement data M2-2 and M3-2 that is the closest to the occurrence time of the RLF and is obtained previously may be correlated with the downlink measurement data M1 (in a time window), so as to determine a link coverage problem. If the data M1 is abnormal, and the correlated data M2 and M3 is normal, the reason for the RLF is that a coverage problem exists in a downlink or the uplink coverage is greater than the downlink coverage; if the data M1 is normal, and the data M2-2 and M3-2 is abnormal, the reason for the RLF is that a coverage problem exists in an uplink or the uplink coverage is less than the downlink coverage. After the link coverage problem is determined, a correct solution may be used to solve the link coverage problem. For example, if the link coverage problem is the uplink coverage problem, after optimization and analysis, the uplink coverage may be optimized and compensated by adjusting an antenna parameter (an azimuth angle, a downtilt angle, and the like) and a parameter of the UE, such as initial transmit power; if the link coverage problem is the downlink coverage problem, after optimization and analysis, the downlink coverage may be optimized and compensated by adjusting an antenna parameter (an azimuth angle, a downtilt angle, and the like) and a parameter of a base station, such as transmit power, which thereby solves the problem of unbalanced uplink and downlink coverage.

It can be seen in this embodiment, that the downlink measurement data and the uplink measurement data may be correlated by using the time window; and a location of the time window is determined according to time of a radio link key event, a size of the time window is determined according to an allowable range for time correlation, and the allowable range for time correlation is generally preset by a network side in advance and is generally greater than or equal to a collection period of the uplink measurement data, so that at least one group of uplink measurement data may be correlated in the time window. The time of the radio link key event used for determining the location of the time window is an occurrence moment of the radio link key event or an absolute timestamp when the radio link key event occurs. It can be seen that, the time window may be a period of time before or a period of time after the occurrence moment (or the absolute timestamp of the occurrence) of the radio link key event, or a period of time covering the occurrence moment (or the absolute timestamp of the occurrence) of the radio link key event, which is not limited in this embodiment.

A timestamp is a reference time point, and is used for performing summation with a relative time offset (time offset) to work out an accurate moment. The absolute timestamp when the radio link key event occurs is an accurate moment worked out by using the reference time point and the relative time offset. The reference time point may be an absolute timestamp when the UE accesses a network, that is, access time recorded on the network side when the UE accesses the network; and the relative time offset is a relative timestamp from time when the UE accesses the network to time when the radio link key event occurs, that is, a time offset from the time when the UE accesses the network to the time when the radio link key event occurs. It can be seen that, the absolute timestamp when the radio link key event occurs is obtained by means of calculation using the absolute timestamp when the user equipment accesses the network and the relative timestamp from the time when the user equipment accesses the network to the time when the radio link key event occurs.

In this embodiment, a role of a time factor is considered, and uplink measurement data and downlink measurement data near the occurrence moment of the radio link key event are correlated with each other, so that the link coverage problem causing the radio link key event may be more accurately located. It can be seen that, combining the correlation using the identifier, which is shown in FIG. 2, and the correlation using the time window can achieve a best effect when the link coverage problem is determined. This situation is described in detail in the following with reference to a scenario shown in FIG. 4.

Figure 4:
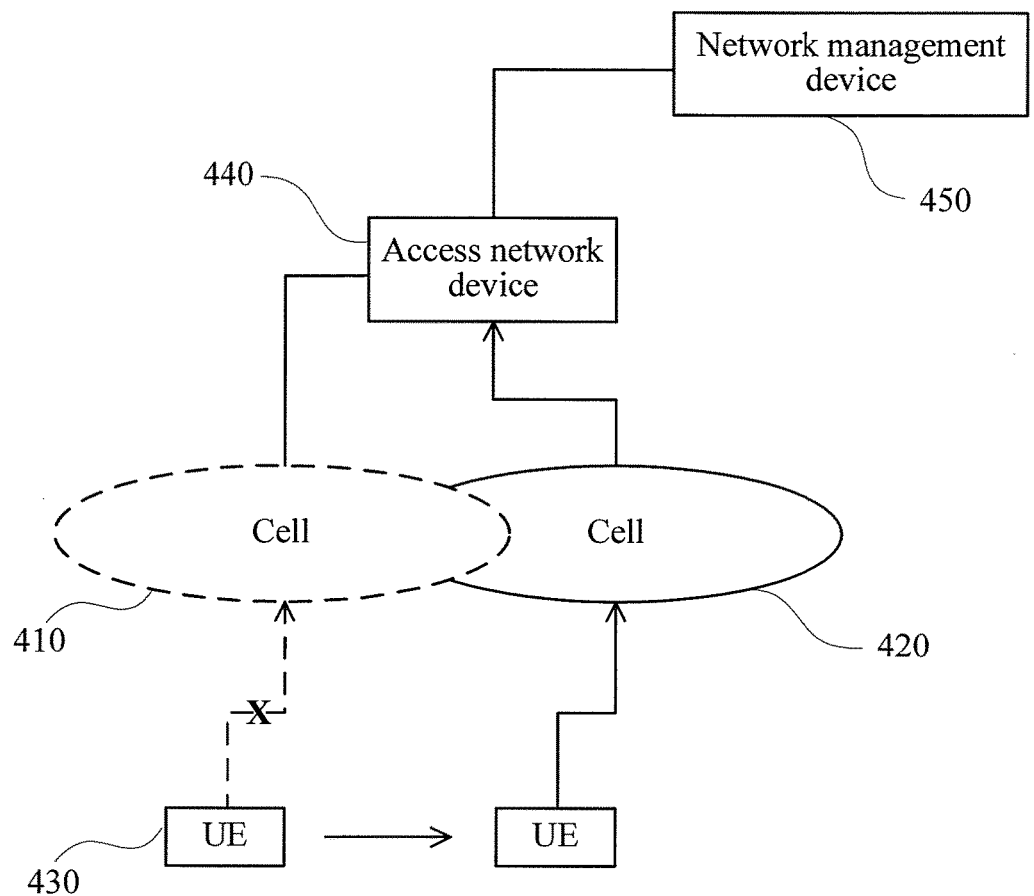
FIG. 4 is a schematic diagram of still another application scenario of a method for determining a link coverage problem according to an embodiment of the present invention.

Refer to FIG. 4, which is a schematic diagram of still another application scenario of a method for determining a link coverage problem according to an embodiment of the present invention. This embodiment combines two manners, which are a correlation using a UE identifier or a cell identifier and a correlation using a time window; herein, the correlation using the UE identifier is used as an example, and the correlation using the cell identifier is similar thereto, which is not described again. As shown in FIG. 4, a link coverage problem exists in a cell 410, and a cell 420 is a normal cell. In this embodiment, the cells 410 and 420 are maintained by a same access network device 440, which is only used as an example, and they may also be maintained by different access network devices, which are not limited in this embodiment. A UE 430 accesses the cell 410. Because the link coverage problem exists in the cell 410, the UE 430 encounters an RLF, and then the UE 430 retries a connection. After the UE 430 successfully accesses the cell 420, the UE 430 reports downlink measurement data to the access network device 440. In addition, after the UE 430 accesses a cell, the access network device 440 may periodically collect uplink measurement data.

After obtaining downlink measurement data of a radio link, the access network device 440 may use a UE identifier to correlate downlink measurement data and uplink measurement data, which are of a same UE or neighboring UEs. Then, a time window is used to correlate uplink measurement data with downlink measurement data, which are near an occurrence moment (or an absolute timestamp of occurrence) of a radio link key event, so as to comprehensively consider the uplink measurement data and the downlink measurement data, and determine the link coverage problem.

A network management device 450 may deliver a storage instruction to the access network device 440, and the storage instruction is used for indicating, to the access network device, information that needs to be stored, for example, storing a correspondence between the UE identifier and a network measurement task identifier (for example, a correlation table of a CRNTI and a TRSR). The UE identifier may be obtained by using a UE context (UE Context); therefore, the storing the correspondence between the UE identifier and the network measurement task identifier may be implemented by storing a correspondence between the UE context and the network measurement task identifier. In addition, the network management device 450 may deliver an allowable range for time correlation to the access network device 440, so that the access network device 440 determines a size of the time window according to the allowable range for time correlation.

Based on the storage instruction delivered by the network management device 450, when the UE 430 performs accessing, the access network device 440 correlates and saves the UE context and the network measurement task identifier. Because the UE context includes the UE identifier, it is equivalent to that the correspondence between the UE identifier and the network measurement task identifier is stored; in this way, in a subsequent correlation process, the downlink measurement data and the uplink measurement data are correlated by using the UE identifier.

In addition, after the UE 430 accesses a network, the access network device 440 may create a network measurement task, so as to trigger network measurement data by event or periodically collect network measurement data. For example, an MDT measurement task is created, so as to obtain MDT measurement data, including uplink measurement data M2 and M3, and downlink measurement data M1.

When the RLF occurs, the UE 430 records an occurrence moment of the RLF or a relative timestamp from time when the UE accesses the network to time when the RLF occurs. Then, the UE 430 continuously retries a connection, and when successfully connecting to the cell 420, the UE 430 reports an RLF report, so as to report the previously recorded occurrence moment of the RLF (or the relative timestamp from the time when the UE accesses the network to the time when the RLF occurs) and the downlink measurement data M1 to the access network device 440.

After receiving the RLF report, the access network device 440 may use the UE context and the network measurement task identifier that are previously stored to correlate downlink measurement data and uplink measurement data, which are of a same UE or neighboring UEs. In addition, the time window is determined by using the occurrence moment of the RLF (or the relative timestamp from the time when the UE accesses the network to the time when the RLF occurs) and the allowable range for time correlation that is delivered by the network management device 450, so that uplink measurement data is correlated with the downlink measurement data after the uplink measurement data outside the time window is filter out. In this way, the uplink measurement data and the downlink measurement data are comprehensively considered to analyze and determine the link coverage problem, and more accurately locate the link coverage problem causing an RLF event.

Certainly, the access network device 440 may also report the obtained RLF report and network measurement data to the network management device 450, and the network management device 450 uses the time window and the UE identifier to correlate the downlink measurement data in the RLF report and the uplink measurement data in the network measurement data, and the link coverage problem is determined according to the correlated uplink measurement data and downlink measurement data. When the link coverage problem is determined, if the downlink measurement data is abnormal, and the uplink measurement data is normal, it is determined that a coverage problem exists in a downlink or uplink coverage is greater than downlink coverage; if the downlink measurement data is normal, and the uplink measurement data is abnormal, it is determined that a coverage problem exists in an uplink or the uplink coverage is less than the downlink coverage.

In the foregoing process of the correlation using the time window, the time window needs to be determined, and a location of the time window is determined according to time of the radio link key event, and the size of the time window is determined according to the allowable range for time correlation. For example, if an occurrence moment of the radio link key event is t, and an allowable range for time correlation is t1, then, a correlation window may be [t−t1/2, t+t1/2], [t, t+t1/2], [t−t1/2, t], or the like, which is not limited in this embodiment. The correlation window only needs to include the occurrence moment of the radio link key event and the size of the correlation window is not beyond the allowable range for time correlation.

Preferably, the time of the radio link key event may be determined by using an accurate absolute timestamp, content of a timestamp of a report of the radio link key event may be extended, and the location of the time window is determined by using an accurate timestamp. In this case, the storage instruction delivered by the network management device 450 to the access network device 440 is further used for instructing the access network device 440 to maintain a <UE identifier, T0> table for a UE that accesses the access network device 440 or is handed over in the access network device 440, where the T0 represents an absolute timestamp when the UE 430 accesses the access network device. In addition, when the RLF occurs, the UE 430 records the relative timestamp from time when the UE accesses the access network device to the time when the RLF occurs. Assume that the relative timestamp is dT and is reported in the RLF report. Then, when receiving the RLF report, the access network device 440 may learn the relative timestamp dT, search the <UE identifier, T0> table, and further learn the absolute timestamp T0 when the UE accesses the access network device, so as to work out an absolute timestamp T0+dT when the UE encounters the radio link key event. In this case, the absolute timestamp T0+dT and the allowable range for time correlation may be used to set the time window, where the allowable range for time correlation is used for determining the size of the time window, and the absolute timestamp T0+dT is used for locating the location of the time window.

It should be noted that, the methods for determining a link coverage problem provided by the embodiments shown in FIG. 1 to FIG. 4 may be executed by the access network device, or may also be executed by the network management device; or the correlation is executed by the access network device, correlated data is transmitted to the network management device, and the network management device determines the link coverage problem. If an entity for executing the methods is the network management device, the access network device needs to transit downlink measurement data and uplink measurement data received and collected by the access network device to the network management device, and correspondences between the UE context (UE Context), the network measurement task identifier, and the allowable range for time correlation that are stored by the access network device need to be transmitted to the network management device, so that the network management device uses these correspondences to perform correlation.

The access network device described above is a device that connects the UE to a wireless network, including but not limited to: an evolved NodeB (evolved NodeB, eNB), a home NodeB (Home NodeB, HNB), a radio network controller (radio network controller, RNC), a base station controller (Base Station Controller, BSC), and a base transceiver station (Base Transceiver Station, BTS). The network management device described above includes but is not limited to an operation, administration and maintenance (operation, administration and maintenance, OAM) system, an element management system (element management system, EMS), an integration reference point manager (Integration Reference Point Manager, IRPManager), or an integration reference point agent (Integration Reference Point Agent, IRPAgent).

Figure 5:
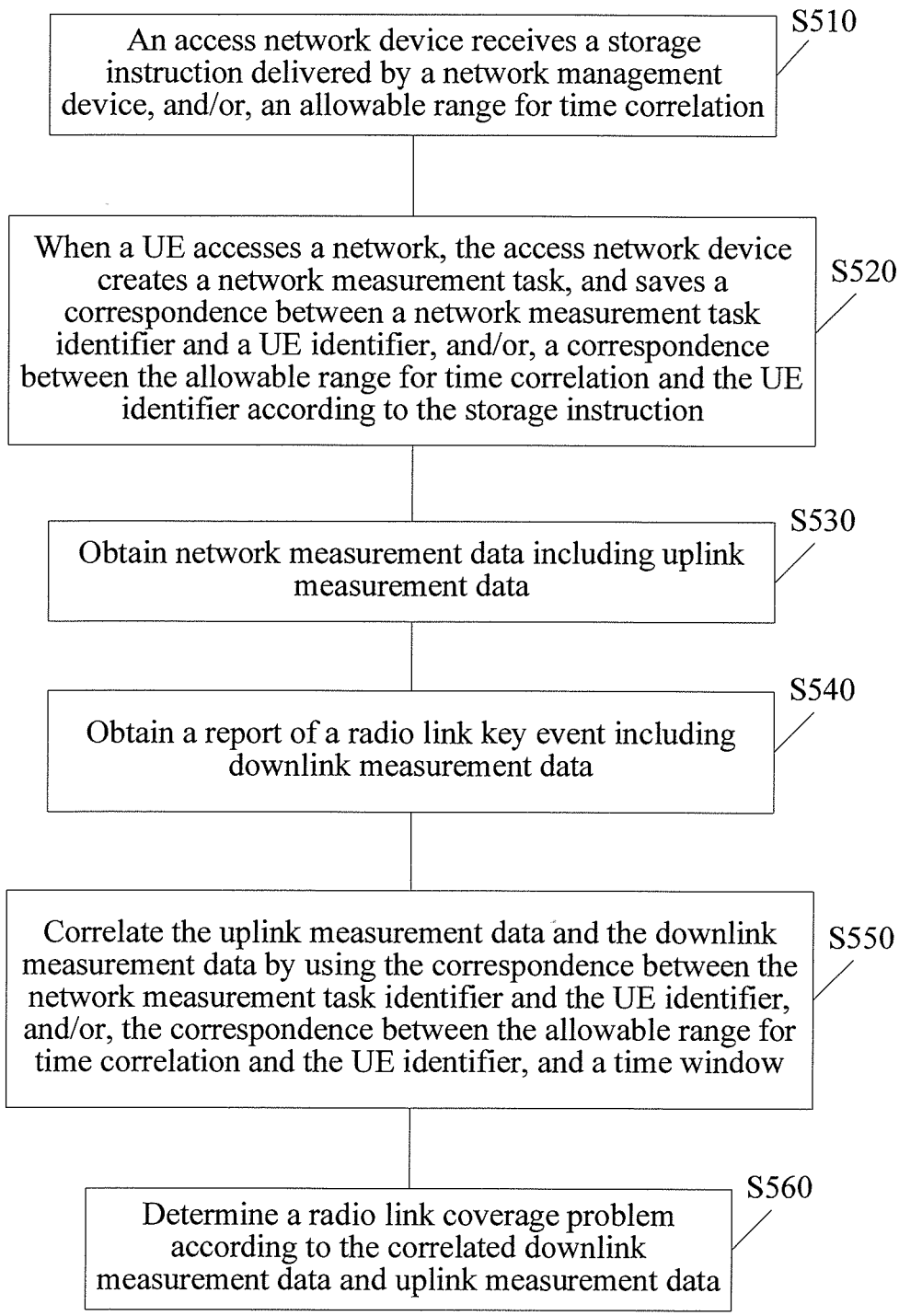
FIG. 5 is a schematic flowchart of a method for determining a link coverage problem according to an embodiment of the present invention.

Descriptions are made in the following with reference to the accompanying drawings. In an embodiment shown in FIG. 5, a link coverage problem is determined by using an access network device on an access network side, and a method for determining a link coverage problem includes the following steps:

S510: An access network device receives a storage instruction delivered by a network management device, and/or, an allowable range for time correlation.

S520: When a UE accesses a network, the access network device creates a network measurement task, and saves a correspondence between a network measurement task identifier and a UE identifier according to the storage instruction, and/or, a correspondence between the allowable range for time correlation and the UE identifier.

S530: Obtain network measurement data including uplink measurement data.

S540: Obtain a report of a radio link key event including downlink measurement data.

S550: Correlate the uplink measurement data and the downlink measurement data by using the correspondence between the network measurement task identifier and the UE identifier, and/or, the correspondence between the allowable range for time correlation and the UE identifier, and a time window, where a size of the time window is determined according to the allowable range for time correlation, and a location of the time window is determined according to time of the radio link key event.

S560: Determine a radio link coverage problem according to the correlated downlink measurement data and uplink measurement data.

It should be noted that, the network measurement data in step S530 may be obtained periodically, and there is no order requirement for step S530 and step S540, that is, the correlated uplink measurement data may be obtained prior to the downlink measurement data, or may also be obtained after the downlink measurement data.

In addition, if the link coverage problem is determined by using the network management device, after step S540, the access network device does not execute the subsequent steps, but reports the obtained uplink measurement data and downlink measurement data to the network management device, and the network management device executes the subsequent steps of performing correlation and determining the link coverage problem. In addition, there is no need to deliver the allowable range for time correlation because subsequently, the network management device may directly determine the time window according to the allowable range for time correlation.

Figure 6:
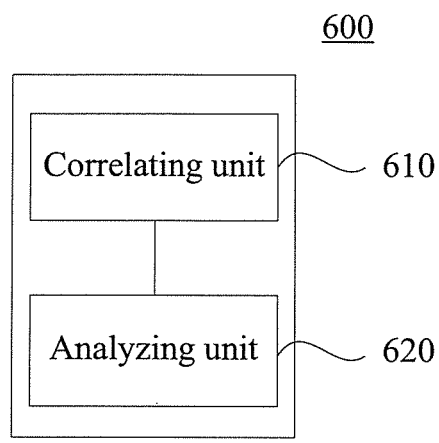
FIG. 6 is a schematic structural diagram of a communications apparatus according to an embodiment of the present invention.

An embodiment of the present invention further provides a communications apparatus, and as shown in FIG. 6, the apparatus 600 includes a correlating unit 610 and an analyzing unit 620. The correlating unit 610 is configured to correlate downlink measurement data and uplink measurement data; and the determining unit 620 is configured to determine a radio link coverage problem according to the correlated downlink measurement data and uplink measurement data.

The downlink measurement data is used to reflect a downlink situation, and may be obtained by means of triggering by a radio link key event. For example, occurrence of an RLF may trigger a UE to send an RLF report, where the RLF report includes the downlink measurement data reflecting the downlink situation, for example, including data reflecting the downlink situation, such as RSRP or RSRQ. Certainly, the RLF is only used as an example, and the radio link key event is not limited in this embodiment. For example, the radio link key event may further be a UE failure, which thereby triggers the UE to send a UE failure report carrying the downlink measurement data.

The uplink measurement data is used to reflect an uplink situation, and may be obtained by means of periodic measurement or reporting, for example, MDT data, RRM data, or PM data obtained by means of periodic measurement or reporting. The data includes the uplink measurement data reflecting the uplink situation, for example, uplink signal strength, uplink signal power, uplink signal quality, or a signal to interference plus noise ratio of an uplink signal.

Figure 7:
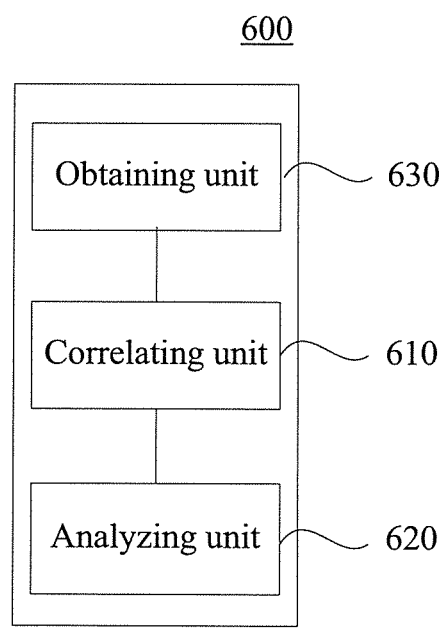
FIG. 7 is a schematic structural diagram of another communications apparatus according to an embodiment of the present invention.

As shown in FIG. 7, the communications apparatus may further include an obtaining unit 630, configured to obtain the downlink measurement data by means of triggering by the radio link key event; and configured to obtain the uplink measurement data by means of periodic measurement or reporting.

The correlating unit 610 may correlate the uplink measurement data and the downlink measurement data by using a time window, may also correlate the uplink measurement data and the downlink measurement data by using a user identifier, or may also correlate the uplink measurement data and the downlink measurement data by using a combination of the two manners.

Figure 8:
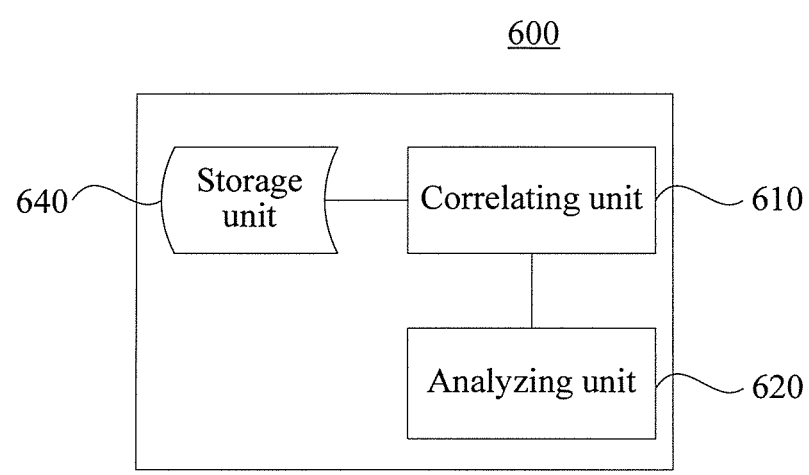
FIG. 8 is a schematic structural diagram of still another communications apparatus according to an embodiment of the present invention.

In addition, as shown in FIG. 8, the communications apparatus 600 may further include a storage unit 640, where the storage unit may be configured to store an allowable range for time correlation delivered by a network management device, and may further be configured to store a correspondence between a network measurement task identifier and a UE identifier and a correspondence between the allowable range for time correlation and the UE identifier, for example, a <network measurement task identifier, UE identifier> table, and a <allowable range for time correlation, UE identifier> table.

When the correlating unit 610 is configured to correlate the downlink measurement data and the uplink measurement data by using the time window, the correlating unit 610 determines a location of the time window according to time of the radio link key event, determines a size of the time window according to the allowable range for time correlation stored by the storage unit 640, and correlates the uplink measurement data and the downlink measurement data in the time window after the time window is determined. For processes of determining the time window and correlating the uplink data and the downlink data, reference may be made to the method embodiments shown in FIG. 1 to FIG. 4, which are not described herein again.

When the correlating unit 610 is configured to correlate the downlink measurement data and the uplink measurement data by using the UE identifier (or a cell identifier), because the UE identifier (or the cell identifier) may be reported at the same time when the downlink measurement data is reported corresponding to the radio link key event, it can be known that the reported downlink measurement data belongs to which UE (or cell); the correlating unit 610 finds uplink measurement data of a corresponding or neighboring UE (or cell) according to the correspondence between the network measurement task identifier and the UE identifier, so as to correlate the uplink measurement data with the downlink measurement data, which are of a same UE (or cell) or neighboring UEs (or cells).

When the correlating unit 610 is configured to correlate the downlink measurement data and the uplink measurement data by using the time window in combination with the UE identifier (or the cell identifier), because the UE identifier (or the cell identifier) may be reported at the same time when the downlink measurement data is reported corresponding to the radio link key event, it is can be known that the reported downlink measurement data belongs to which UE (or cell);

the correlating unit 610 finds uplink measurement data of a corresponding or neighboring UE (or cell) according to the correspondence between the network measurement task identifier and the UE identifier, so as to correlate the uplink measurement data and the downlink measurement data, which are of a same UE (or cell) or neighboring UEs (or cells). In addition, the correlating unit 610 determines the location of the time window according to the time of the radio link key event; finds, according to the correspondence between the allowable range for time correlation and the UE identifier stored in the storage unit 640, a corresponding allowable range for time correlation to determine the size of the time window; and correlates the uplink measurement data and the downlink measurement data in the time window after the time window is determined.

The analyzing unit 620 is further configured to execute analysis processes in the method embodiments shown in FIG. 1 to FIG. 4. If the downlink measurement data is abnormal, and the uplink measurement data is normal, the analyzing unit 620 is configured to determine that a coverage problem exists in a downlink or uplink coverage is greater than downlink coverage; or, if the downlink measurement data is normal, and the uplink measurement data is abnormal, the analyzing unit 620 is configured to determine that a coverage problem exists in an uplink or the uplink coverage is less than the downlink coverage.

It should be noted that, the correlating unit 610, the analyzing unit 620, the obtaining unit 630, and the storage unit 640 may be hardware modules, software modules that can be executed by a processor, or a combination thereof, which is not limited in this embodiment. For example, the correlating unit 610 and the analyzing unit 620 are embedded in a memory of an access network device or a network management device in a form of program code corresponding to functions of the correlating unit 610 and the analyzing unit 620, and the processor invokes the program code corresponding to the correlating unit 610 and the analyzing unit 620, so as to complete correlation and analysis of the uplink measurement data and the downlink measurement data, and determine a link coverage problem. In addition, the obtaining unit 630 may be a receiver of the access network device or the network management device, and the storage unit 640 may be a memory.

The correlating unit 610, the analyzing unit 620, the obtaining unit 630, and the storage unit 640 may function as discrete components existing in the access network device or the network management device, and certainly, a part or the whole may be integrated into a logical entity that is set in the access network device or the network management device, which is not limited in this embodiment.

Referring to FIG. 2 to FIG. 4 continuously, an embodiment of the present invention further provides a communications system, including a UE, an access network device, and a network management system, and the access network device or the network management system includes an apparatus for determining a link coverage problem shown in the embodiment in FIG. 6.

Persons of ordinary skill in the art may understand that all or a part of the steps in the foregoing methods may be implemented by a program instructing related hardware. The program may be stored in a computer-readable storage medium, such as a ROM/RAM, a magnetic disk, or an optical disc.

For example, a computer program product provided in an embodiment of the present invention includes a computer-readable medium, and the readable medium includes a group of program code, used for performing any one of the methods for determining a link coverage problem described in the foregoing embodiments.

In the method, apparatus, and system for determining a link coverage problem, the downlink measurement data is correlated with the uplink measurement data to comprehensively analyze and determine the link coverage problem, which may more accurately determine the link coverage problem causing the radio link key event, and thereby facilitate subsequent use of a correct solution. For example, if the link coverage problem is the uplink coverage problem, after optimization and analysis, the uplink coverage may be optimized and compensated by adjusting an antenna parameter (an azimuth angle, a downtilt angle, and the like) and a parameter of the UE, such as initial transmit power; if the link coverage problem is the downlink coverage problem, after optimization and analysis, the downlink coverage may be optimized and compensated by adjusting an antenna parameter (an azimuth angle, a downtilt angle, and the like) and a parameter of a base station, such as transmit power, which thereby solves the problem of unbalanced uplink and downlink coverage.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for determining a radio link coverage problem, the method comprising:
    obtaining, by a network device, downlink measurement data by means of triggering by a radio link key event, wherein the radio link key event is a radio link failure (RLF) measurement;
    obtaining, by the network device, uplink measurement data by means of periodic measurement or reporting;
    correlating the downlink measurement data and the uplink measurement data by using a time window and at least one of a user equipment identifier or a cell identifier, wherein a location of the time window is determined according to a time of the radio link key event, and a size of the time window is determined according to an allowable range for time correlation; and
    determining a radio link coverage problem according to the correlated downlink measurement data and uplink measurement data.

2. The method according to claim 1, wherein, the uplink measurement data is obtained by using minimization of drive test (MDT), performance management (PM), an alarm, a trace, or radio resource management (RRM) measurement.

3. The method according to claim 1, wherein the time of the radio link key event is an occurrence moment of the radio link key event.

4. The method according to claim 1, wherein the time of the radio link key event is an absolute timestamp when the radio link key event occurs, and the absolute timestamp when the radio link key event occurs is obtained by means of calculation using an absolute timestamp when a user equipment accesses a network and a relative timestamp from time when the user equipment accesses the network to time when the radio link key event occurs.

5. The method according to claim 1, wherein determining the radio link coverage problem according to the correlated downlink measurement data and uplink measurement data comprises:
- when the downlink measurement data is abnormal, and the uplink measurement data is normal, determining that a coverage problem exists in a downlink or uplink coverage is greater than downlink coverage; or
- when the downlink measurement data is normal, and the uplink measurement data is abnormal, determining that a coverage problem exists in an uplink or uplink coverage is less than downlink coverage.

6. A network device, comprising:
a processor; and
a memory coupled to the processor, the memory comprising instructions that, when executed by the processor, cause the network device to:
obtain downlink measurement data by means of triggering by a radio link key event, wherein the radio link key event is a radio link failure (RLF) measurement;
obtain uplink measurement data by means of periodic measurement or reporting;
correlate the downlink measurement data and the uplink measurement data by using a time window and at least one of a user equipment identifier or a cell identifier, wherein a location of the time window is determined according to a time of the radio link key event, and a size of the time window is determined according to an allowable range for time correlation; and
determine a radio link coverage problem according to the correlated downlink measurement data and uplink measurement data.

7. The network device according to claim 6, further comprising instructions that, when executed by the processor, cause the network device to:
obtain the uplink measurement data by using minimization of drive test (MDT), performance management (PM), an alarm, a trace, or radio resource management (RRM) measurement.

8. The network device according to claim 6, wherein the time of the radio link key event is an occurrence moment of the radio link key event.

9. The network device according to claim 6, wherein the time of the radio link key event is an absolute timestamp when the radio link key event occurs, and the absolute timestamp when the radio link key event occurs is determined by using an absolute timestamp when a user equipment accesses a network and a relative timestamp from lime when the user equipment accesses the network to time when the radio link key event occurs.

10. The network device according to claim 6, wherein:
- when the downlink measurement data is abnormal, and the uplink measurement data is normal, a coverage problem exists in a downlink or uplink coverage is greater than downlink coverage; or
- when the downlink measurement data is normal, and the uplink measurement data is abnormal, a coverage problem exists in an uplink or uplink coverage is less than downlink coverage.

11. A non-transitory computer-readable storage medium encoded with computer-executable instructions that, when executed by a data processing system, cause the data processing system to perform the steps of:
obtaining downlink measurement data by means of triggering by a radio link key event;
obtaining uplink measurement data by means of periodic measurement or reporting;
correlating the downlink measurement data and the uplink measurement data by using a time window and at least one of a user equipment identifier or a cell identifier, wherein a location of the time window is determined according to a time of the radio link key event, and a size of the time window is determined according to an allowable range for time correlation; and
determining a radio link coverage problem according to the correlated downlink measurement data and uplink measurement data.

* * * * *